July 14, 1964 B. J. RUSSELL 3,140,618
OVERTRAVEL MECHANISM
Filed April 7, 1960 3 Sheets-Sheet 1

INVENTOR.
BILLY J. RUSSELL
BY
ATTORNEY

*INVENTOR.*
BILLY J. RUSSELL

July 14, 1964  B. J. RUSSELL  3,140,618
OVERTRAVEL MECHANISM
Filed April 7, 1960  3 Sheets-Sheet 3

INVENTOR.
BILLY J. RUSSELL
BY
ATTORNEY

United States Patent Office 3,140,618
Patented July 14, 1964

3,140,618
OVERTRAVEL MECHANISM
Billy J. Russell, La Mirada, Calif., assignor to
North American Aviation, Inc.
Filed Apr. 7, 1960, Ser. No. 20,783
4 Claims. (Cl. 74—10.2)

This invention relates to overtravel mechanisms for the control of rotatable equipment, and particularly to means for permitting an input shaft to turn over a desired angular range beyond that in which it exercises direct rotational control of such equipment.

The embodiment here shown is directed toward the control of a high precision potentiometer, but it might equally well be applied to control of a capacitor, inductor, shaft drive in general, or any other device for varying the physical or electrical parameters of a particular piece of equipment.

The use of a potentiometer to provide a variable potential representative of distance traveled in a precision display, or in computing a course and the distance traveled therealong in arriving at the present position of a vehicle, such as a ship or an aircraft, is well known. It is desirable to be able to expand a selected portion of the range. This operation may also be described as providing a vernier scale over the selected portion. One of the essential features is the reproducibility of the selected characteristics; that is, after the insertion of a given number of turns of the potentiometer vernier and their subsequent removal, exactly the same potential output should be obtained, so that the starting point of the expanded range is accurately reproducible.

The invention is described as it has been embodied in a system for automatically computing the instantaneous position of a particular vehicle on which the device is carried. The position of the potentiometer may be controlled by a servo motor after signals indicative of distance traveled have been derived from a distance meter, or other means for obtaining a measure of distance traveled.

The objects of the invention thus include providing an expanded scale over that portion of the angular range of the overtravel mechanism which is of particular interest.

A further object is to provide a vernier scale covering a preselected portion of the range scale with which the invention is intended for use.

Another object of this invention is to provide an overtravel mechanism which allows continued rotation beyond a predetermined limit.

A further object of this invention is to provide an overtravel drive mechanism which allows continued rotational turns beyond a predetermined limit of such drive and requires such continued rotational turns to be removed before again taking up such drive.

Still another object is to provide a vernier control over a preselected portion of the scale which will permit returning exactly to the previous position when shifted back from the vernier to the main scale.

A still further object is to improve the resolution of a range indicator over a selected portion of the range.

Yet another object is to provide a vernier scale expansion for any piece of rotary equipment desired over a selected portion of its rotational range.

These and other objects of the invention may be better understood by reference to the accompanying drawings, in which.

The essential features of this invention are: expanding a selected portion of the range of a control element, remembering the number of turns inserted in the expanded portion, and returning exactly to the initial point of the expanded range at will. The selected portion when used in conjunction with the potentiometer as herein described should be at one end of the range, or else under the control of a vernier selection relay, since the stop members in the potentiometer or associated with the relay are the effective elements in shifting from normal to vernier operation. This is effected by causing a locking member, or selection arm, in the potentiometer to shift from position for direct drive to position for planetary drive. The planetary drive is brought into play by the stops within the potentiometer and by locking the selection arm to the unit housing.

Figure 1:
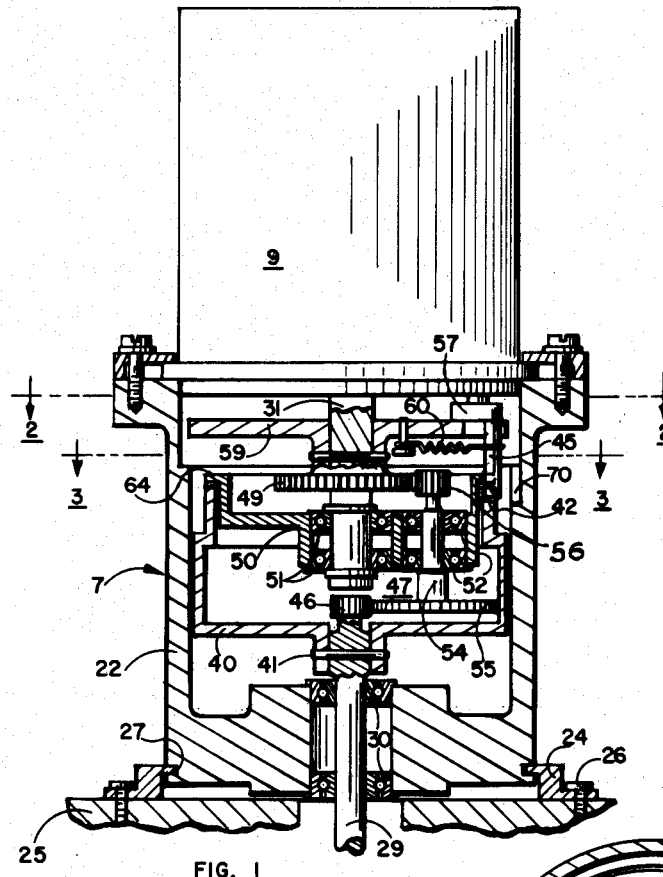
FIG. 1 is an elevational view partially in section of the invention as applied to the control of a multi-turn potentiometer, showing details of the mechanism in position for normal operation.
Figure 2:
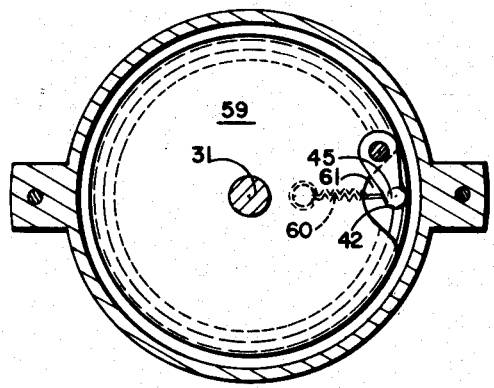
FIG. 2 is a sectional view taken as indicated by line 2—2 of FIG. 1.
Figure 3:
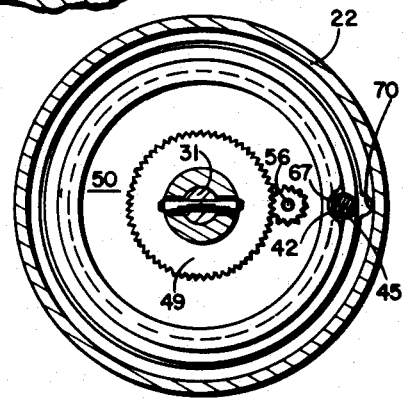
FIG. 3 is a sectional view taken as indicated by line 3—3 of FIG. 1.

This invention may be better understood by reference to the drawings, in FIG. 1 of which the invention is shown embodied in equipment for the control of a multi-turn potentiometer. The particular embodiment is shown as it has been applied to a position indicating device for longitude in a variable destination control system. Similar equipment may be provided in cooperation therewith for latitude indication, so that the position of the plane, ship, or other vehicle, may be determined and displayed continuously.

Figure 7:
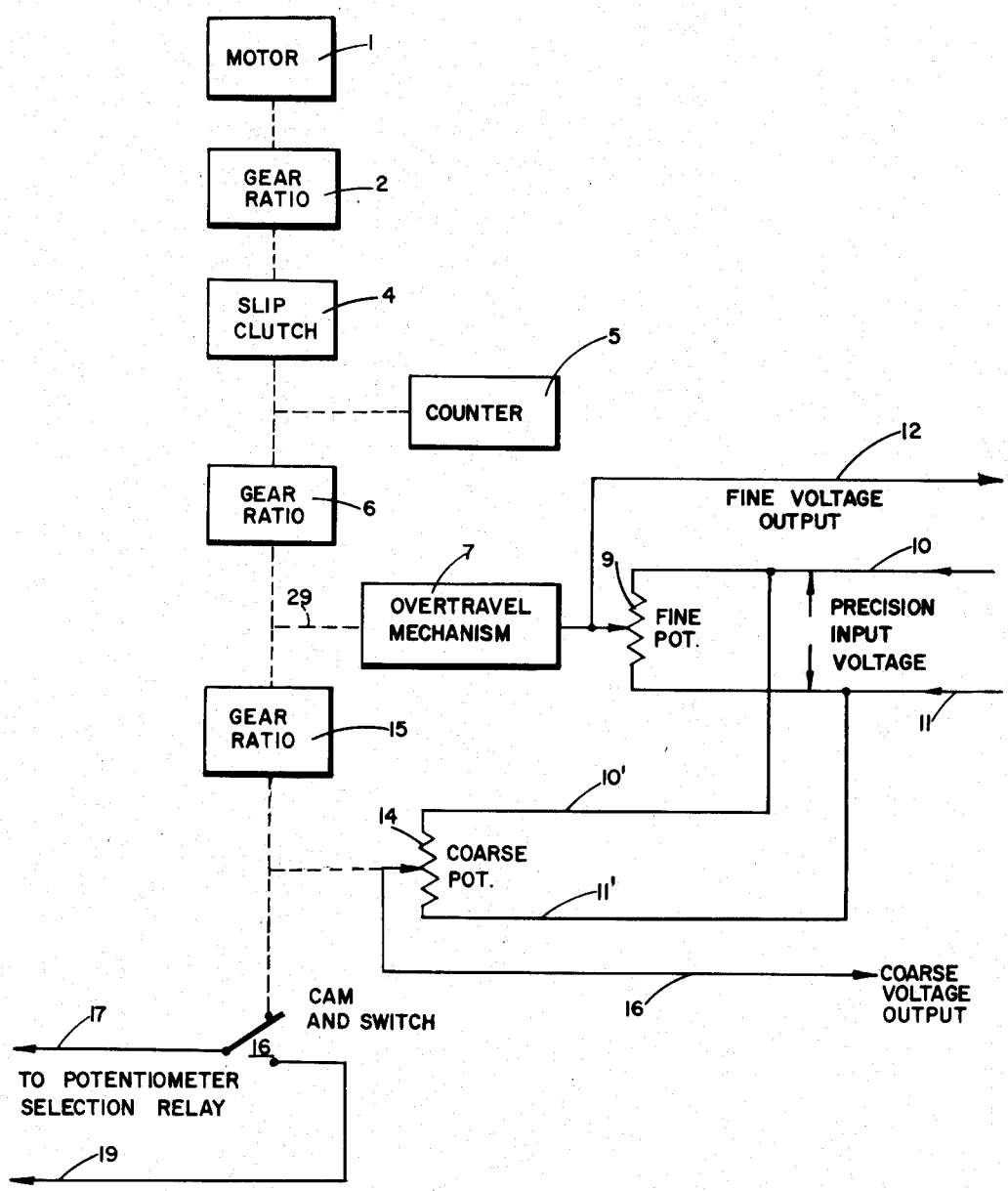
FIG. 7 is a schematic circuit diagram showing how the invention is incorporated into equipment for computing and indicating the present position of the vehicle.

The significant portion of the overall system in which the invention is incorporated is shown schematically in FIG. 7. It will be understood that an input proportional to the distance traveled along a line such as an East-West meridian may be fed into the system.

This input is supplied, as by electrical signals, causing proportional rotation of a motor 1 through suitable gear ratio means 2 and a slip clutch 4 to a counter 5. Counter 5 cumulates the input and may be calibrated to read in any desired distance unit, as knots, miles or yards.

Second gear ratio means 6 may transmit rotation proportional to that of motor 1 through the overtravel mechanism 7 of the invention to the fine potentiometer 9. Potentiometer 9 receives a precision voltage input through leads 10 and 11 and delivers a fine voltage output through lead 12.

The same input voltage is applied through leads 10' and 11' across a coarse potentiometer 14, which is driven from motor 1 through a third gear ratio device 15. The coarse voltage output from potentiometer 14 is delivered through a lead 16 to other equipment, not shown, where it may be used for the normal display. Alternatively, the fine voltage output delivered through lead 12 may be used for more precise display and computation.

Where the display equipment receives its signals from the coarse potentiometer 14 or from the fine potentiometer 9 is controlled by the operation of the cam and switch combination 16. Cam and switch combination 16 connects through leads 17 and 19 to a potentiometer selection relay, not shown, to adapt the display equipment to receive signals from the desired potentiometer. The requisite circuitry will be obvious to those skilled in the art, and forms no part of the prevent invention.

Referring now to FIG. 1 of the drawings, the invention has been illustrated as applied to the control of the fine, or multi-turn, potentiometer 9. In a particular embodiment, potentiometer 9 required 10 complete revolutions to pass from one end of its scale to the other. Internal stops, not shown, limit rotation of potentiometer 9 at both ends of its range. The overtravel mechanism of the invention, indicated generally as 7, is shown as enclosed in a housing 22, which is secured to associated equipment by means such as plurality of bracket members 24. Bracket members 24 are mounted on the supporting framework 25 of the associated equipment, by bolts 26. Each of the bracket members 24 is adapted to extend into a positioning groove 27 formed circumferentially about the housing 22. By loosening the bolts 26, the entire housing 22 may be rotated to secure the exact initial alignment desired. The housing is then fixed in place by retightening the bolts 26.

The housing 22 receives at the input end an input shaft 29, supported for rotation by anti-friction bearings 30 and driven by the associated equipment, not shown, to register the extent of travel of the particular device. The rotation of input shaft 29 is applied to the potentiometer 9, mounted at the opposite end of housing 22, through gearing means to be described hereafter, acting to turn a drive transmission shaft 31, which applies the input directly to the potentiometer.

The drive between input shaft 29 and drive transmission shaft 31 is effected at unity ratio, as explained below, when operating to supply signals from the fine potentiometer 9. It may be effected in an alternative way, depending upon the portion of the range scale which is being measured by the device. If the device is functioning in fine control position, so that voltage output of the fine potentiometer 9 is being used for calculation and display, the drive is transmitted at unity ratio through the overtravel unit 7. If operating in the coarse control portion of the range, the rotation of shift 29 is not transmitted to shift 31 at unity ratio. The planetary portion of unit 7 then permits the input shaft to continue to rotate for an extended number of turns, depending on the gear ratios in the planetary portion, while the potentiometer remains in the same position. This overtravel arrangement may be brought into play by the engagement of suitable stop members within the potentiometer at one end or the other of the range. The circuitry for accomplishing the transition between the coarse and fine control may be better understood by referring to the schematic of FIG. 7.

Figure 4:
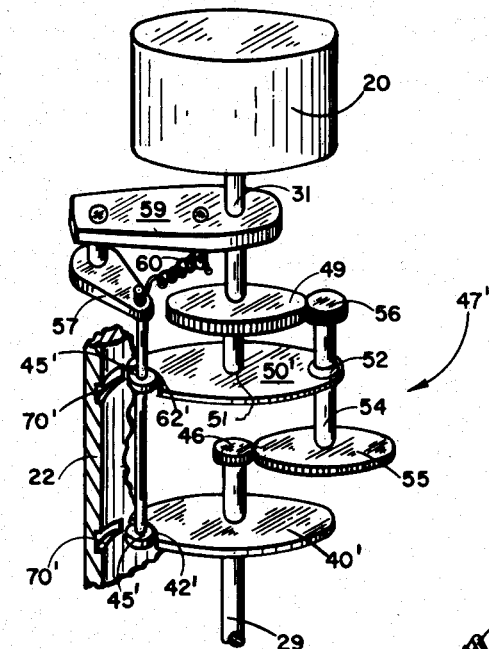
FIG. 4 is an exploded schematic view showing the operative relation of the elements of the invention rotated 180 degrees about the vertical axis for clarity in illustration.
Figure 5:
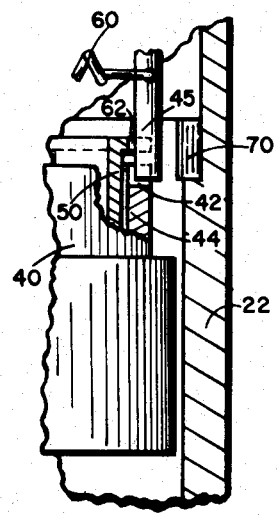
FIG. 5 is a fragmentary enlarged view, partially in section, corresponding to that of FIG. 1 and showing the details of the detent means of the invention in position for expanded scale operation.

As seen in FIG. 1, input shaft 29 is mounted in the antifriction bearings 30 for rotation within housing 22 coaxially with the rotating elements of potentiometer 9. A cup-shaped input coupling ring 40 is fixed to input shaft 29 by means such as a pin 41, and is arranged to surround the planetary gearing indicated generally at 47. Ring 40 has a locking cut-out recess 42 formed circumferentially through the upper portion 44 thereof, as seen in FIG. 5. Recess 42 is engaged by a roller coupling member 45, which locks the input coupling ring 40 to the input shaft 31 of the potentiometer by means to be described in detail hereafter. This supplies the unity ratio drive when control is exercised through fine turn potentiometer 9. The details may be seen schematically in the expanded view of FIG. 4, where the circular member 40′ has the same function as ring 40, receiving the roller coupling member 45′ in locking recess 42′. Other corresponding elements are designated by the same reference numerals as in FIG. 1, with the addition of the prime symbol.

When the coarse control potentiometer 14 is in control, a shift to the planetary overtravel drive is effected. The input shaft 29 has mounted terminally thereof, within the input coupling ring 40, an input pinion 46. Both the input coupling ring 40 and the input pinion 46 are secured to and rotate unitarily with the input shaft 29. Pinion 46 is the first, or initial, driving gear member of a planetary gear train 47 connected at its opposite end to the potentiometer 9 through the drive transmission shaft 31. In the opposite end of the housing 22, into which projects the potentiometer drive transmission shaft 31, are disposed the driven elements of the planetary drive, including the final sun gear 49 of the planetary gear train 47. Final gear 49, when drive transmission shaft 31 is locked, causes the rotation of the planetary carrier 50 therearound. When the planetary gear train 47 is active, this overtravel arrangement permits input shaft 29 to rotate through many turns while drive transmission shaft 31 is stopped. The planetary gear train 47 is supported in a cup-shaped planetary carrier 50 mounted rotatably on drive transmission shaft 31 and coaxially within the input coupling ring 40 by means of suitable bearings 51. The planetary carrier 50 has a dual function, being also concerned with control of the number of turns permitted when shaft 29 is operating in override mode, that is, using coarse potentiometer 14. Carrier 50 has mounted eccentrically therein a second set of bearings 52, which serve to hold rotatably the planetary shaft 54. On shaft 54 is fixedly mounted the first driven planetary gear 55, which is always in mesh with the first member of the planetary gear train 47, that is, the input pinion 46. On the end of the planetary shaft 54 opposite first driven planetary gear 55 is fixed an intermediate planetary drive pinion 56. The intermediate planetary drive pinion 56 is always in mesh with the final sun gear 49.

When the input coupling ring 40 is locked relative to the potentiometer drive transmission shaft 31, the planetary gearing does not function to transmit torque between input shaft 29 and the drive transmission shaft 31.

Torque is then entirely transmitted through a sequence including the input coupling ring 40, the first locking cut-out recess 42, roller coupling member 45, a pivot arm 57 to which the roller coupling member 45 is rotatably fixed, and a pivot arm support plate 59 which is mounted fixedly on shaft 31. The roller coupling member 45 is held in the locking cut-out recess 42 by the tension of a pivot arm detent spring 60. Clearance for the member 45 is provided by a recess 61 formed in plate 59. Spring 60 has a tension sufficient to hold the roller coupling member 45 in detent locking engagement with the recess 42 until a predetermined torque about shaft 29 is exceeded. As long as the potentiometer input shaft 31 is free to continue to turn, the detent locking engagement will continue between the input coupling ring 40 and the potentiometer drive shaft 31 through the pivot arm 57 and the pivot arm support plate 59. At the end of the travel of the potentiometer shaft, however, internal stops in the potentiometer, not shown, will prevent further rotation of shaft 31. If input shaft 29 continues to turn thereafter, the restraining tension in the pivot arm detent spring 60 will be exceeded. As input coupling ring 40 continues to turn, the roller coupling member 45 will be forced radially out of the locking cut-out recess 42 and into engagement with an oppositely disposed locking recess 70 formed in the housing 22.

When the roller 45 engages the locking recess 70, the shaft 31 will be locked relative to the housing 22. Any further rotation of input shaft 29 results, not in continued rotation of potentiometer input shaft 31, but in the actuation of the planetary gear train 47 and rotation of the planetary carrier 50. With input shaft 29, coupling ring 40, and input pinion 46 continuing to revolve, the first driven planetary gear 55 and the planetary carrier 50 will be urged to revolve about the axis of input pinion 46. Since the gear 55 is rotatably mounted in the bearings 52, the planetary drive shaft 54 will transmit the rotational movement of pinion 46 by driving the intermediate planetary drive pinion 56. Since pinion 56 is engaged with the driven or final planetary sun gear 49, which is locked by virtue of its attachment to the drive transmission shaft 31, pinion 56 will ride around the circumference of gear 49 as shaft 29 is rotated, carrying with it planetary carrier 50. Hence, as the input shaft 29 continues to turn, there will result a low speed rotation of the planetary carrier 50 on bearing 51 relative to shaft 31. The exact number of turns permitted of the input shaft 29 will, of course, depend on the ratio between the planetary driving and driven gears, but in this particular embodiment the ratio was such that a rotation of about 25 turns of the input shaft could be obtained after the initiation of its operation before the planetary carrier 50 had made one turn. Subsequent to this operation, the direction of rotation of input shaft 29 may be reversed by reversing the direction of motor 1, and the entire assembly may then return to an angular position exactly identical with that which it occupied when the transition from low speed to high speed drive was first initiated. If rotation is continued until the coarse potentiometer occupies the same angular position as when the fine potentiometer was disengaged, the fine potentiometer will be re-engaged at its original angular relationship to the portions of the system which have been continuously engaged. This relation may be shown on means for indicating the total turns accumulated in the device, as the counter 5.

Figure 6:
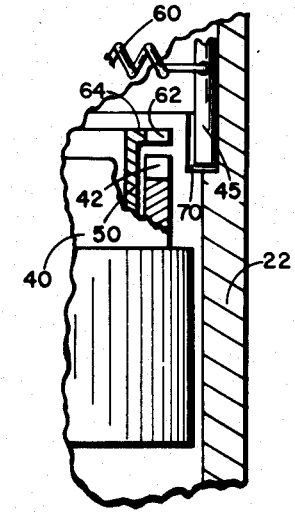
FIG. 6 is a view corresponding to that of FIG. 5 but showing the detent means in position for normal scale operation.

The return to the initial angular position cannot be effected until an alinement notch 62, formed in a rim 64 projecting outwardly from the upper periphery of the cup-shaped planetary carrier 50, as best seen in FIG. 6, has again reached proper position. When the alinement notch 62 in the carrier rim 64 has returned to registry with the locking cut-out recess 42 in the upper portion 44 of input coupling ring 40, the spring 60 will be able to draw the roller coupling member 45 out of detent engagement with notch 70 of the housing 22, and back into locking engagement with locking cut-out recess 42 of input coupling ring 40. This cannot occur until the planetary carrier 50, in which the alinement notch 62 is formed, has rotated back exactly the same number of turns as it was rotated forward after initial disengagement of the detent roller coupling member 45 from the locking cut-out recess 42. This may be checked on the counter 5.

The invention thus provides positive means for insuring that the return to fine potentiometer control position will occur at exactly the same angular relation to the rest of the equipment as did its departure therefrom.

Although this invention has been described and illustrated in detail, it is to be clearly understood that the same is by way of illustration and example only and is not to be taken by way of limitation, the spirit and scope of this invention being limited only by the terms of the appended claims.

I claim:

1. In combination with a rotatable member arranged to be turned through a range of a plurality of turns, and having an internal stop at the end of said turning range; means for providing an expanded ratio between the rotations of an input shaft and the rotations of said rotatable member over a selected range comprising: a housing arranged to support said rotatable member and to have an input shaft extending rotatably and coaxially thereto; an input coupling ring fixed to said input shaft within said housing, a locking aperture being formed through a circumferential portion of said coupling ring; a pinion fixed to said input shaft; a shaft extending from said rotatable member coaxially into said housing opposite said input shaft; a coupling arm holder fixed to said rotatable member shaft; a coupling arm pivotally fixed to said coupling arm holder; a locking roller rotatably secured on said coupling arm, said roller being positioned parallel to the said rotatable member shaft; means for resiliently urging said roller toward the axis of rotation of said rotatable member; said housing having a locking recess formed therein adapted for engagement with said locking roller; a planetary carrier rotatably mounted on said rotatable member shaft, said planetary carrier having an alinement aperture formed therein adapted for engagement with said locking roller member alternatively with the engagement of said locking roller member with said locking recess formed in said housing; a first driven planetary gear rotatably supported on said planetary carrier in position to engage said input shaft pinion; a driving planetary pinion fixedly connected to said first planetary gear in coaxial relationship thereto; and a planetary sun gear meshing with said driving planetary pinion and fixed to said rotatable member shaft, whereby said locking roller engages said locking recess to lock said rotatable member shaft to said housing when said rotatable member reaches the end of its turning range and said planetary carrier rotates with said input shaft relative to said rotatable member shaft.

2. The device substantially as described in claim 1, wherein said locking recess is adapted to provide a detent lock releasable only on exertion of a rotational pressure by said input shaft means in excess of a predetermined value.

3. In a device having input means and a rotatable member having a drive shaft arranged to be turned through a range of a plurality of turns and having stop means effective at each end of said range, means for providing an expanded ratio of turns between said input means and said rotatable member over a selected portion of said range comprising: a housing for said device; a mounting for said housing; means for adjusting the angular position about said rotatable member of said housing relative to said mounting; input coupling ring means fixed to said input shaft within said housing, a locking aperture beng formed in the circumference of said coupling ring means; a coupling member connected to said rotatable member; a planetary carrier rotatably mounted on the shaft of said rotatable member and having an alinement notch formed circumferentially therein adapted to permit entry of said coupling member therethrough; and means for urging said coupling member against said coupling ring and said planetary carrier, said coupling member being engaged in said planetary carrier alinement notch and said coupling ring locking aperture only when said input means and the drive shaft of said rotatable member are in a predetermined angular relationship with each other and said rotatable member is within its range of turns.

4. In combination: input drive means; output means comprising a rotatable member arranged to be driven through a range of a plurality of turns and having stop means effective at each end of said range; overload clutch means responsive to said stop means for engaging said output means with said input means through said range of turns and for disengaging said input drive means from said output means to permit said input means to continue to drive beyond said range while said output means remains stopped.

References Cited in the file of this patent

UNITED STATES PATENTS

| | | |
|---|---|---|
| 2,277,883 | Rich | Mar. 31, 1942 |
| 2,308,492 | Culbertson | Jan. 19, 1943 |
| 2,484,667 | Arisman et al. | Oct. 11, 1949 |
| 2,662,422 | McGowan | Dec. 15, 1953 |
| 2,754,687 | Brandon | July 17, 1956 |
| 2,761,331 | Buescher | Sept. 4, 1956 |
| 2,780,200 | Winters | Feb. 5, 1957 |
| 2,791,920 | Ray | May 14, 1957 |
| 2,909,066 | Randolph et al. | Oct. 20, 1959 |
| 2,922,308 | Hunter | Jan. 26, 1960 |

FOREIGN PATENTS

| | | |
|---|---|---|
| 491,446 | Great Britain | Sept. 1, 1938 |